March 28, 1961

R. BASSINGER 2,976,944

PERCUSSION DRILL BIT

Filed Sept. 27, 1957

INVENTOR
Ross Bassinger

BY Browning, Simms, Hyer & Eickenroht

ATTORNEYS

United States Patent Office 2,976,944
Patented Mar. 28, 1961

2,976,944
PERCUSSION DRILL BIT

Ross Bassinger, San Antonio, Tex., assignor to Bassinger Tool Company, San Antonio, Tex.

Filed Sept. 27, 1957, Ser. No. 686,689

6 Claims. (Cl. 175—410)

This invention relates to percussion drill bits using hard metal inserts as cutting surfaces.

Bodies for drill bits are generally forged from a metal blank. Wings are formed with faces in which the hard metal inserts are mounted. The inserts are usually of tungsten carbide, mounted in grooves in the wing faces.

Material cut by the wing inserts is usually cleaned from the hole by fluid which is jetted against the bottom of the hole from a supply passageway through the center of the bit body. There is a problem of distributing this fluid efficiently over the bottom of the hole to clean it of cuttings. Openings associated with the center of the bit face, communicating with a source of fluid, create a problem of getting effective digging at the center of the face. Extending the inserts of the wings to the center of the face to provide central digging is not desirable because the distributing passages cannot then be arranged most effectively with respect to the material cut by the inserts.

If the wing inserts are to be supported in grooves which do not extend completely across the bit face, there is a problem of how to machine these grooves with simple operations and give adequate lateral support of the inward end of the inserts. Providing grooves at the center of the face for inserts and arranging them with the distributing passageways to best advantage gives the additional problem of machining these central grooves with simplicity.

Finally, the central digging does not cause nearly the wear of the outer digging. As the central portion of the bit has a much longer life than the outer portion, there is a problem of making the central portion of the bit readily available for use in a series of bits as the useful life of their outer portions is exhausted.

An object of the invention is to provide a plug body for the face of a percussion drill bit which will enable an insert groove in the wing to be formed by simple machining cuts across the wing face and an insert groove in the plug body to be formed by a simple machining cut across the plug face.

Another object of the invention is to provide a plug body in the face of a winged percussion drill bit which will support cutting inserts at the center of the bit face and proportion the supply of cleaning fluid over the parts of the hole bottom cut by each wing insert.

Another object is to provide lateral support against central displacement of the inserts in wings of a percussion drill bit, central cutting of laterally unsupported formation and efficient cleaning of cuttings from this hole.

Another object of the invention is to provide a winged percussion drill bit which has inserts in its wings and also at its center with the arrangement being such that the wing inserts can be sharpened without eliminating the vertical distance between the cutting edge at the lower end of the wing and the cutting edge at the lower end of an insert supported at the center of the bit face.

Another object of the invention is to provide a removable single structure for a winged percussion drill bit which will give lateral support to wing inserts, support digging inserts at the center of the bit face and distribute cleansing fluid over the bottom of the hole dug which can be used in a series of similar bits.

Another object is to provide a solid head bit which affords adequate uniformity of fluid distribution over the bottom of the hole even though the discharge of fluid from the bit is localized and even though the flow passages up along the bit are of different sizes so as to provide different resistances to upward flow of the fluid.

The invention comprehends a percussion drill bit with wings having radial grooves extending across the bit face in which inserts are supported against displacement toward the bit center by abutting a removable center plug, which plug also carries insert structure in a groove and has passages opening into the space between inward ends of the wing inserts for jetting fluid on the hole portions cut by the wing inserts.

Another aspect of the invention comprehends a removable plug centered in the face of a winged percussion drill bit and abutting the inner ends of wing inserts to give them inward lateral support, the plug being countersunk into the body far enough above the wing faces so that inserts in the plug are supported in a cutting plane sufficiently far above that of the wing inserts that the wing inserts can be sharpened repeatedly without raising their cutting plane to that of the central inserts.

The invention further comprehends a plug centrally inserted in the face of a winged percussion drill bit which is removable so that a milling cutter can be passed in straight lines across the center of the bit face to form grooves in the wing faces in pairs and across the plug face to form an insert groove therein.

In accordance with another aspect of the invention, the wings of the bit are situated so that at least one wing lies circumferentially closer to a second wing than it does to a third. This provides spaces extending up along the bit body which spaces are of smaller and larger cross-sectional areas. A jet is then provided to direct fluid into the smaller space between the more closely adjacent wings. Since the smaller space has a greater resistance to upward flow of fluid than does the larger space, the fluid tends to "overflow" into the larger space. Thus, by directing the fluid into the more restricted space and overflowing it into the less restricted space, a more uniform distribution of fluid is obtained.

Other objects, advantages and features of this invention will be apparent to one skilled in the art upon consideration of the written specification, appended claims, and attached drawings, wherein:

A percussion tool mechanism (not shown on the drawings) delivers percussive energy to the bit. A drill string rotates, or indexes, the bit at the same time the percussive energy is delivered to it. Hard metal inserts on the bit face provide the cutting surfaces which dig cuttings from the formation. The bit is on the lower end of the tool and may be integral with its anvil, or attached by threads.

The body 1 of the bit is formed from a metal blank which is first preformed by forging. The forward portion of this blank is generally shaped to provide wings 2. The rear portion of the forged blank is reduced and is here shown as a tapering portion 3. Portion 3 is illustrated as provided with threads for making up with the drill anvil. Spaces or recesses 4 are formed between the wings during the forging and extend rearwardly from the bit face. The front surfaces at the lower ends of wings 2 are faced normal to the longitudinal axis of the bit body, and the outside diameter of the sides of the wings is then brought down to a desired dimension.

The preferred form of the bit, illustrated, has been given a cruciform shape. However, the number of wings given the bit is not to be taken as limiting the invention. A center line through the faces of opposite wings passes through the longitudinal center line, or axis, of the bit. These center lines of the faces of the two pairs of wings are directed outward from the center line of the bit so as to subtend a pair of opposite acute angles and a pair of opposite obtuse angles in the cruciform shape.

Figure 2:
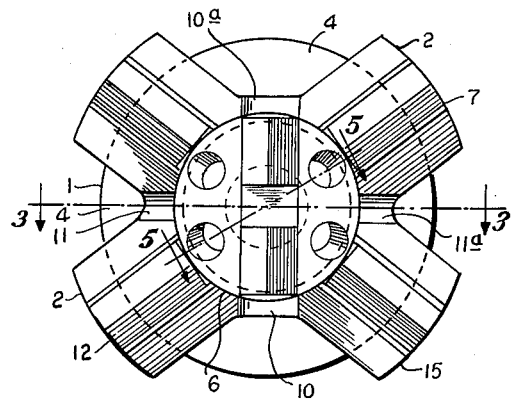
Fig. 2 is a bottom end elevation of the drill bit of Fig. 1.

This arrangement wherein the wings are at angles of other than 90 degrees with respect to each other, as shown best in Fig. 2, was primarily adopted to prevent sticking of the bit in some relatively soft formations. The cracks, or fracture lines of some formations are generally at right angles to each other. If the cutting edges of the bit were also at right angles with respect to each other, they would occasionally coincide or match with the fracture lines of these formations. If a drilling blow were delivered to the bit when the cutting edges and fracture lines matched, the bit would be driven down excessively into the formation and would become wedged therein so as to make it difficult to rotate or index the bit. Since the fracture lines of a formation lie at a constant angle to each other and the angles between consecutive cutting surfaces around the bit are alternately acute and obtuse, all the cutting edges cannot strike upon fracture lines when the fracture lines lie at 90 degree angles to each other. At least some of the cutting surfaces will strike the formation at an angle not coinciding with fracture lines, and non-coiniding cutting edges will prevent the cutting members from being driven into cracks in the formation to such an extent as to jam the bit against indexing or rotation.

A central passageway 5 is drilled co-axially through the bit. Fluid supplied to this passageway is used as a cleansing agent in lifting cuttings from the hole bottom up the outside of the drill bit.

Figure 1:
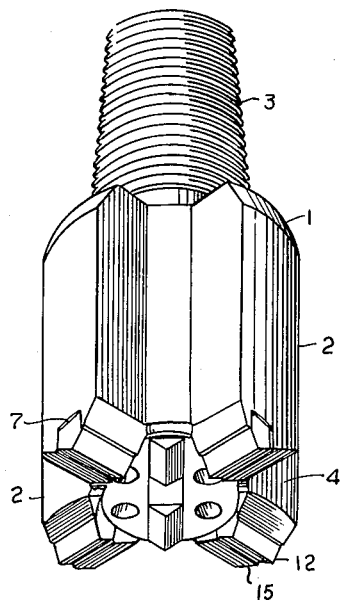
Fig. 1 is a perspective view illustrating one form of a drill bit constructed in accordance with the invention.
Figure 3:
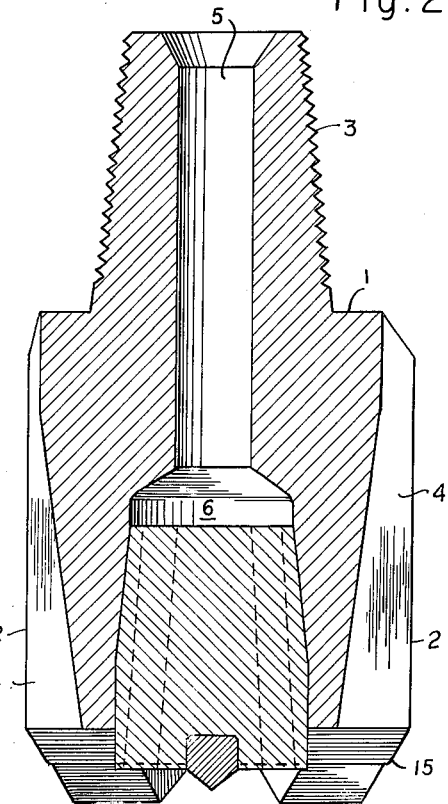
Fig. 3 is a longitudinal quarter section of the drill bit of Fig. 2 taken along lines 3—3 of Fig. 2.

Radial grooves 7 are cut through the faces of wings 2 by a suitable tool such as a milling machine. The shape of a cross-section of these grooves 7 is apparent from Fig. 1. The grooves 7 are given parallel sides and these sides are joined with the plane of the bottom surface of each groove in a slight curve. Each groove is machined to pass through the wall of the counter-bore 6 and the side wall of its wing.

It has been indicated that the fluid forced down the center of the bit, and jetted on the bottom of the hole, flows up the outside walls of the bit. Spaces, or recesses, 4 extending rearwardly from the bit face, provide access upward for this fluid and cutting carried by it. Grooves 10, 10a and 11, 11a are cut in the face of the bit, between adjacent wings, to facilitate the passage of cuttings and fluid from the bit face and up the side of the bit.

Tungsten carbide inserts 12 are placed in the wing 2 grooves and secured therein by silver solder or suitable brazing material. To secure a sufficiently strong bond between insert and drill bit head is a difficult problem. Care must be taken to provide for even flow of bonding material between the surfaces of insert and body wall adjacent each other when the inserts are positioned in their grooves. If the insert body surfaces abut the walls of their grooves tightly, the bonding material will not flow between them. Due to the removable plug and winged shape of the bit providing insert receiving portions extending from the main bit body, bonding of the inserts in place is facilitated. Thus the wing inserts can be placed and the lower end of the wing can be readily heated, as by wrapping an induction coil around only such lower end, so that the brazing or soldering can occur. This affords only localized heating of the bit body so that closer control of the brazing or soldering is obtained. The plug inserts can be brazed or soldered in place by simply wrapping the induction coil around the lower end of the plug. Thus by this construction, only localized heating is employed thereby giving much better control of the brazing or soldering process.

The inserts are cast with a bevel to form their cutting edge. The wings in which they are mounted are formed to match, and align, with the angle of the inert bevel. This beveling of wings 2, to the angle of the cast cutting edges of the inserts, forms edges 15 on the outer periphery of the wings 2. As the bit is indexed, edge 15 becomes the leading edge of this portion of the wing 2 adjacent the wall of the hole. Care should be exercised to maintain this edge 15 sharp so cuttings will not pack between the bit and hole wall to jam and prevent indexing of the bit. The gage of the dug hole is maintained by applying sufficient energy per blow delivered to the bit to cause it to break the formations, laterally, a finite distance beyond the perimeter of the bit face.

Figure 4:
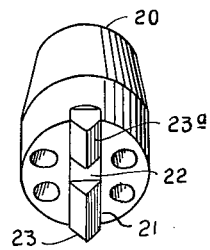
Fig. 4 is a perspective view of a plug forming part of the drill bit removed from the body of the bit.
Figure 5:
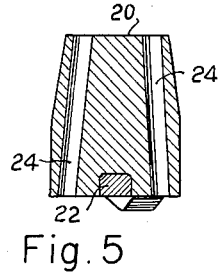
Fig. 5 is a longitudinal section of the plug taken along lines 5—5 of Fig. 2.

Counter-bore 6 of the bit body receives central plug 20. Figs. 4 and 5 illustrate details of this central plug and its relationship with the bit body is shown in the preceding drawings. In general the plug is made of material similar to that of which body 1 is constructed. Also plug 20 is fabricated from a blank which is easily formed in a lathe. The profile of plug 20 is shown most clearly in the section of Fig. 5.

When plug 20 is in position, at the center of the bit body, it is an obstruction to forming grooves 7 by straight passes of milling cutter across the center of the bit face. Therefore, plug 20 is made as a removable body in counter-bore 6 to meet this problem. As grooves 7 in the wing faces are aligned in pairs across the axis of the bit body, each pair of grooves can be milled with a milling cutter passed in a single direction. Further, grooves 10, 10a and 11, 11a, between adjacent wings, can be readily cut in the same manner, with the plug 20 removed.

A groove for supporting insert structure is cut in the plug face. This groove can be cut with a milling cutter moving in a straight line, transverse the plug axis when the plug is removed from counter-bore 6.

If the winged bit body were other than cruciform, for example, if there were but three wings, the milling operations to form the wing grooves would remain simple. However, rather than being able to pass the cutter entirely across the face and cut a pair of wing grooves in the same direction, the cutter could only pass through one wing face at a time. However, the machining operation would still require only simple, straight-line, passes of the milling cutter to the bit face center.

The disclosed arrangement of winged percussion drill bit body and removable, central, plug with cutting inserts offers a fundamental advantage in manufacturing. Where it is desired to form grooves in both the faces of the wings and the face of the plug, for mounting digging inserts, the fact that the two bodies are separate, eliminates obstruction to using straight milling cuts which save time and money in production. The illustrated bit of a cruciform shape and with central plug, has five grooves for inserts, but require only three straight passes of the cutting tool to form the grooves when the two bodies are separated and individually machined. Also, grooves 10, 10a and 11, 11a are formed with only two simple, straight cutting passes.

The rear portion of plug 20 is formed into a sticking taper. The front portion of plug 20 is given a cylindrical form. Counter-bore 6 in passageway 5 receives this plug positively, with a matching shape. The plug is preferably shrunkfit into the bit to provide, with the sticking taper, a very rugged union with the bit body. The cylindrical front portion becomes an inner wall for the wing grooves 7. This wall solidly backs up the inner ends of the inserts 12 so they will not be displaced toward the center of the bit face by the stress of digging impacts.

Although inserts 12 are made of cast metal, their dimensions can be held to close tolerances. Casting their inner ends with a curve to give uniform contact with the cylindrical surface of the central plug may not be practical. Therefore, the ends are illustrated as simply having a flat plane which will have line contact with the cylindrical surface of the plug. In either case, the provision of a cylindrical portion for plug 20 at this point gives more than point contact for abutment of the two bodies.

Plug 20, machined separately from bit body 1, has a groove 21 milled through its face. Groove 21 can be formed to require a single carbide insert or two shorter carbide bodies 23 and 23a with a separating body 22 between them. These inserts 23 and 23a form the cutting surface at the center of the bit face. The spacer 22 is made of body, or plug, material. It has been found that it is undesirable to abut two carbides together in this service. Therefore, the spacer 22 is desired to separate the two inserts when two are used.

The horizontal planes of the cutting surface of wing inserts 12 and of the cutting surface of plug inserts 23, 23a are preferably vertically displaced from each other along the axis of the bit. The plug inserts plane is above that of the wing inserts and most of the percussive energy delivered to the bit is developed on the wing inserts. The wing inserts must be driven with enough force to dig the virgin material at the bottom of the hole which is laterally supported by the formation and to give the horizontal gaging overbreak.

The horizontal axis of the plug inserts is off-set at an angle from the axes of the wing inserts. As the drill string indexes the bit, the plug inserts cut the virgin material at the bit center, left by the leading wing insert, as a raised portion, of the formation. This raised portion is not laterally supported by formation material. Therefore, relatively little of the percussive energy is needed to dig this portion effectively. The plug inserts, vertically above the wing inserts are, consequently, subject to less wear than the wing inserts. The plug 20 will usually outlast a number of bit bodies, being readily removed from a worn out bit and placed in a new one. However, the plug inserts are spaced sufficiently far above the wing inserts, so the wing cutting inserts can be sharpened without eliminating the distances between the cutting planes.

Sweeping the cuttings from the hole bottom will now be considered as carried out with the fluid from passageway 5. It is desired to direct this fluid efficiently over the hole bottom in volume sufficient to lift all cuttings up the hole around the outside of the bit and drill string.

All of the drawings show branch passageways 24 in the plug body. The arrangement of these passageways, to gain the most efficient distribution of fluid, must take the insert on the plug face into consideration and the location of the wing inserts, aligned in pairs across the bit face center to form bit face areas bounded by a pair of obtuse angles and a pair of acute angles defined by the aligned inserts. Additionally, the grooves 10, 10a between the pair of obtuse angles and the grooves 11, 11a between the pair of acute angles are recognized as aiding in conducting the cleansing fluid from the bit face at different rates. More fluid flowing radially from the center of the bit face would pass through the obtuse angle areas or spaces because these areas are larger than the acute angle areas.

In general, it is desired to direct the cleaning fluid into the acute angle areas as close as practical to inserts 12. With the cleaning fluid primarily directed into the acute angle areas through which the fluid will find greater resistance to flow then through the obtuse angle areas, some of the fluid will flow into the obtuse angle areas to flush cuttings therefrom.

The desired pattern of fluid flow is obtained by placing insert structure 23, 23a between the obtuse angles formed in the aligned pairs of inserts 12 and placing the openings of branches 24 for discharge into the acute angle area and where four such branches are used, preferably for discharge closely adjacent the inner ends of main cutting inserts 12. Further, the branches 24 are sloped outwardly from the inner face of plug 20 to jet their equal portions of cleansing fluid over the cuttings of the inserts 12. The fluid is thereby concentrated over the two acute angle areas of the hole bottom, given primary direction over the main cutting areas and the surplus portion allowed to spill over into the obtuse angle areas. Thus the pattern of fluid distribution is formed in view of the particular location of the cutting surfaces and the capacities of the passages available to the fluid from the bit face. The result is an efficient cleansing of cuttings from the bore hole.

The basic requirement of structural arrangement to obtain this efficient cleansing action is dividing the supply of cleaning fluid between the acute angle areas. It would be simpler, from the standpoint of manufacture to form only two branches 24, one to each acute angle area. The single opening in each acute angle area would be desirably placed equal distances between the two wing inserts 12 to divide the effetciveness of the sweeping action of fluid from the passage 5 on their cuttings. The surplus of fluid would flow over into the obutse angle areas to complete the lifting of all cuttings from the hole. However, the preferred arrangement is to employ a plurality of distributing passageways to give the fluid primary direction toward the main cutting areas of the hole beneath the inserts.

The central plug of the bit has been shown to have a multiplicity of functions due to its particular shape and placement with respect to the other parts of the bit. Further, the various grooves required in the face of the main bit body and the groove in the surface of the plug have been developed in forms that require only simple machining operations with a milling cutter when the plug is removed from the body. The result of the invention is to provide an economical construction for a bit, as well as a configuration for a bit which causes it to function with maximum efficiency.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings to be interpreted as illustrative and not in a limiting sense.

The invention having been described, what is claimed is:

1. An impact drill bit having a body with a main forward portion having a cross-section with a generally cruciform shape of wings formed in pairs aligned across the longitudinal axis of the body to form a pair of opposite acute angles and a pair of opposite obtuse angles, a groove formed in the face of each wing, and a passageway formed centrally and longitudinally through the body for fluid to be distributed over cuttings of the bit in sweeping them from the hole and having a counter-bore from the plane of the wing faces; a removable plug positioned in the counter-bore of the body passageway and having a groove formed in the front face of the plug for receiving an insert, an insert structure mounted in the groove in the front face of the plug, the plug being positioned in the counter-bore so the centerline of the insert structure passes between the obtuse angles of the body wings, and branch passageways longitudinally through the plug to register with the central passageway of the body and opening into the areas between the pair of acute angles of the body wings, to jet fluid of the cuttings formed under the wings; and cutting inserts fastened in each wing face groove to form the main cutting surfaces of the bit.

2. The drill bit of claim 1 in which the branch passageways through the plug are divided into two pairs with each longitudinally diverging from the bit axis and opening in the areas between the acute angles of the body wings and closely adjacent the inner ends of the wing grooves.

3. A percussion drill bit including a body with a forward portion formed with a plurality of wings spaced about the body with some of the angular spacing between adjacent wings being at an acute angle and other of the angular spacing between adjacent wings being at an obtuse angle, a groove formed in the front face of each wing, a passageway formed centrally and longitudinally through the body, a removable plug in the passageway at its end adjacent the wing faces, a groove in the front face of the plug, a wear resistant cutter insert fastened in each of the grooves of the wings and plug, and a passageway extending through the plug from the passageway in the body and having its discharge end situated to direct fluid between said adjacent wings having an acute angle therebetween whereby the fluid is initially directed into the space between the wings having the greatest resistance to flow so that fluid distribution between the various wings is more uniform.

4. A percussion drill bit including a body with a forward portion formed with a plurality of wings spaced about the body with some of the angular spacing between adjacent wings being at an acute angle and other of the angular spacing between adjacent wings being at an obtuse angle, a groove formed in the front face of each wing, a passageway formed centrally and longitudinally through the body, a removable plug in the passageway at its end adjacent the wing faces, a groove extending across the front face of the plug, a wear resistant cutter insert fastened in each of the grooves of the wings and plug with the inserts in the wings abutting their inner ends against the sides of the plug, the plug being rotationally positioned so that the groove therein is out of register with the wing grooves and so that the centerline of the plug groove lies between the wings which are at an obtuse angle with respect to one another, and branch passageways through the plug from the passageway discharging at a point within the acute angle formed by the wings as aforesaid whereby fluid is initially directed into the space between the wings having the greatest resistance to flow and whereby the insert in the plug tends to divert fluid into such space so that fluid distribution between the various wings is more uniform.

5. A percussion drill bit comprising a body having a central passageway for fluid therein and having a forward portion formed with a plurality of wings spaced from each other about the body, with some angular distances between adjacent wings being smaller than other angular distances between adjacent wings; a groove in the front face of each wing, disposed radially about the passageway, adapted to receive a hard cutting member; a plug body removably disposed in the central passageway having an exterior surface abutting an inner end of each of said grooves and having a groove extending across its forward face adapted to receive a hard cutting member; a hard, wear-resistant cutting member fastened in each of said grooves in wing faces; a hard, wear-resistant cutting member fastened in said groove in the front face of the plug; the front edge of each cutting member in a groove in a wing being disposed a substantial distance in advance of the front edge of the cutting member fastened in the groove in the plug face; said plug comprising passageways branching through the plug body from a common connection with the central passageway to discharge openings in the plug face closely adjacent to cutting members in wings spaced from each other by smaller angular distances, for flushing substantially all cuttings from the face of the bit through spaces between the wings.

6. The bit of claim 5 wherein an inner end of each cutting member is disposed in a slot in a wing abutting the exterior periphery of the plug; and the plug is disposed with the groove in the plug face at a radial angle which does not coincide with the radial angle of any wing groove.

References Cited in the file of this patent

UNITED STATES PATENTS

| 580,352 | Symonds | Apr. 6, 1897 |
| 884,331 | Hardsocg | Apr. 7, 1908 |
| 1,056,132 | Staub | Mar. 18, 1913 |
| 1,169,369 | Wakfer | Jan. 25, 1916 |
| 1,204,805 | MacDonald | Nov. 14, 1916 |
| 1,737,507 | Mercer | Nov. 26, 1929 |
| 2,200,482 | Winslow | May 14, 1940 |
| 2,282,596 | Wise et al. | May 12, 1942 |
| 2,464,781 | Baker | Mar. 22, 1949 |
| 2,628,821 | Alexander et al. | Feb. 17, 1953 |
| 2,634,954 | Eakin | Apr. 14, 1953 |
| 2,807,443 | Wyman | Sept. 24, 1957 |
| 2,884,227 | Hjalsten | Apr. 28, 1959 |

FOREIGN PATENTS

| 850,283 | Germany | Sept. 29, 1952 |